US012149335B2

(12) United States Patent
Parangodath et al.

(10) Patent No.: US 12,149,335 B2
(45) Date of Patent: Nov. 19, 2024

(54) METHOD FOR IMPROVING AUDIO ACQUISITION TIME BY NASCENT SIGNAL CACHING

(71) Applicant: INNTOT TECHNOLOGIES PRIVATE LIMITED, Kerala (IN)

(72) Inventors: Abdul Sameeh Parangodath, Kerala (IN); Dileep Achunni Parvathi, Kerala (IN); Geethu Stanly, Kerala (IN)

(73) Assignee: Inntot Technologies Private Limited, Kerala (IN)

( * ) Notice: Subject to any disclaimer, the term of this patent is extended or adjusted under 35 U.S.C. 154(b) by 0 days.

(21) Appl. No.: 18/141,733

(22) Filed: May 1, 2023

(65) Prior Publication Data

US 2024/0267142 A1 Aug. 8, 2024

(30) Foreign Application Priority Data

Feb. 7, 2023 (IN) ............................ 202341007941

(51) Int. Cl.
*H04H 40/18* (2008.01)
*H04H 20/33* (2008.01)

(52) U.S. Cl.
CPC ............ *H04H 40/18* (2013.01); *H04H 20/33* (2013.01); *H04H 2201/13* (2013.01)

(58) Field of Classification Search
CPC .... H04H 40/18; H04H 20/33; H04H 2201/13; H04H 2201/20
See application file for complete search history.

(56) References Cited

U.S. PATENT DOCUMENTS

2008/0240231 A1* 10/2008 Yang .................... H04N 21/654 348/E5.003

* cited by examiner

*Primary Examiner* — Rahel Guarino
(74) *Attorney, Agent, or Firm* — Millen, White, Zelano & Branigan, P.C.; William F. Nixon

(57) ABSTRACT

A method improves audio acquisition time by nascent signal caching. The receiver system includes the processor which contains the ASRC (Arbitrary Sample Rate Converter), demodulator, channel splitter, channel decoder and middleware & application along with the secondary storage system. The nascent digital broadcast radio signal after the sample rate conversion is cached in a secondary storage and given as input to the demodulator. The demodulator starts the demodulation process over the received signal by utilizing default channel parameters and detects the channel parameters of the received signal. If the default channel parameters are different from the detected channel parameters, the demodulator starts the re-demodulation process with the detected channel parameters over the nascent digital signal cached in the secondary storage, instead of waiting for a subsequently transmitted signal, thereby improving the audio acquisition time.

11 Claims, 2 Drawing Sheets

METHOD FOR IMPROVING AUDIO ACQUISITION TIME BY NASCENT SIGNAL CACHING

FIELD OF INVENTION

The present invention relates to the field of digital radio broadcasting, more specifically to the field of radio reception systems. This invention is a method to improve user experience by nascent signal caching and subsequent re-demodulation in digital broadcast radio.

BACKGROUND OF THE INVENTION

Digital broadcast radios use digital technology for transmission and reception of signals over the radio spectrum. Digital broadcast radios can be used in all frequency bands (Low Frequency (LF), Medium frequency (MF), High Frequency (HF), Very High Frequency (VHF), etc). There are different digital broadcast radio standards established, like the Digital Radio Mondiale (DRM), Digital Audio Broadcasting (DAB), HD radio, Convergent Digital Radio (CDR), etc. which specify the frequencies, type of carrier signals, modulation to be used, etc. Digital broadcast radios are high quality digital replacements for analog radio broadcasts in AM and FM.

Some of the features of digital broadcast radios are:

Digital broadcast radios support both audio and data.

Digital broadcast radios provide good audio quality.

Digital broadcast radios provide a greater number of services in a single frequency.

Digital broadcast radios support data services like journaline, Electronic Programme Guide (EPG) and slide shows.

Digital broadcast radios support the Emergency Warning System (EWS).

In determining a digital broadcast radio's quality, one of the major performance differentiators is the time taken for audio output after tuning to a frequency. Most digital broadcast radios use OFDM technology. In OFDM technology, OFDM channel parameters like guard interval length, useful data part length, number of carriers, etc. have a major role in the demodulation process. For accurate demodulation, the OFDM channel parameters used for the demodulation should be correct. For example, there are five robustness modes and six spectrum occupancies in DRM (a type of broadcasting standard). The choice of transmission parameters depends on signal robustness wanted and propagation conditions. The transmission signal can be affected by noise, large delay spread and Doppler spread, interference, multipath wave propagation, as well as the Doppler effect. For different robustness modes and spectrum occupancies, the OFDM channel parameters are different. Generally, the DRM receiver initiates processing with default channel parameters corresponding to default robustness mode and spectrum occupancies. The robustness mode and spectrum occupancy of the transmitted signal are detected from the received signal. If the default robustness mode or spectrum occupancy is different than the actual robustness mode and spectrum occupancy received, then the received nascent signal processed with the wrong channel parameters will become invalid. So, the DRM receiver has to wait before receiving the DRM signal needed for the audio output.

Thus, there exists a need for reducing the waiting time for digital receiver systems, when the transmitted signal channel parameters are different from that of the receiver system's default channel parameters. The different patents related to digital radio receiving systems are given below:

The patent methods and apparatus for fast signal acquisition in a digital video receiver (U.S. Pat. No. 8,208,533B2) relates to storing raw transmission parameters to provide a faster approach for synchronizing with the frame boundaries of transmission parameter blocks to decode digital video signals, whereas the present invention aims at storing the nascent digital signal and re-demodulating it, if default and actual parameters are different, to improve acquisition time.

The patent methods and device for fast acquisition of digital video signals (CN101277437B) relates to a method of storing the initial set of video parameters, demodulating video transmission parameter information to obtain raw parameter data, and updating the initial set of video transmission parameter values based on the raw parameter data to provide an intermediate set of video transmission parameter values for fast acquisition. The present invention aims to re-demodulate the stored nascent digital signal if the default parameters and actual parameters are different, to save acquisition time.

The patent, Broadcast receiving apparatus and channel searching method thereof (WO2009107980A1) comprises a broadcast receiving apparatus and channel searching method wherein, the broadcast receiving apparatus optimally sets a signal reception state of the stored channel according to bit error rate information passed through a booster and tuner. The present invention's memory storage process is specific to cache the nascent digital signal and perform re-demodulation to address the problem when initial channel parameters configured in the receiver apparatus are different from the actual channel parameters.

The present invention avoids further waiting time required for receiving DRM signals for the audio output and thus avoids the additional time taken for audio output with digital broadcasting radios because of the wrong channel parameter considered for the demodulation process.

Objective of the Invention

The main objective of the present invention is to avoid the waiting time for receiving the digital signal again when the nascent digital signal parameters vary from the receiver system default parameters. Another objective of the present invention is to also provide a storage system to cache the nascent digital signal after the sample rate conversion.

A third objective of the present invention is to improve the user experience by reducing the time taken for radio audio output when the received signal's channel parameters are different from that of the default channel parameters of the receiver.

SUMMARY OF THE INVENTION

The following summary is provided to facilitate a clear understanding of the new features in the disclosed embodiment and is not intended to be a full, detailed description. A detailed description of all the aspects of the disclosed invention can be understood by reviewing the full specification with the drawings.

The aim of the present invention is to provide a method to improve user experience by nascent signal caching and subsequent re-demodulation in digital broadcast radio systems. The present invention relates to a radio receiver system with the following components: the processor containing an ASRC (Arbitrary Sample Rate Converter), Demodulator, Channel splitter, Channel decoder and Middleware & Application. The ASRC component will convert the tuned digital broadcast radio signal sample rate to the sample rate of the Demodulator component. The Demodulator receives nascent Digital broadcast radio signals after the sample rate conversion. The Demodulator input data is stored in secondary storage. The Demodulator component starts the demodulation process over the received signal by utilizing default channel parameters. The Demodulator output data is split into different channels by the channel splitter. The channel split data is decoded by the channel decoder. Middleware will parse the channel-decoded data and process it as audio and other data. The application then sends the processed data to output devices (speaker & display). If the initial channel parameters utilized for the demodulation process are different from the detected channel parameters, the Demodulator starts the re-demodulation process with the detected channel parameters over the nascent digital signal cached in the secondary storage.

BRIEF DESCRIPTION OF THE DRAWINGS

The manner in which the present invention is formulated is given a more particular description below, briefly summarized above, and may be had by reference to the components, some of which are illustrated in the appended drawing. It is to be noted, however, that the appended drawings illustrate only typical embodiments of this invention and therefore should not be considered limiting to its scope and may admit to other equally effective embodiments.

Throughout the drawings, the same drawing reference numerals will be understood to refer to the same elements and features.

Figure 1:
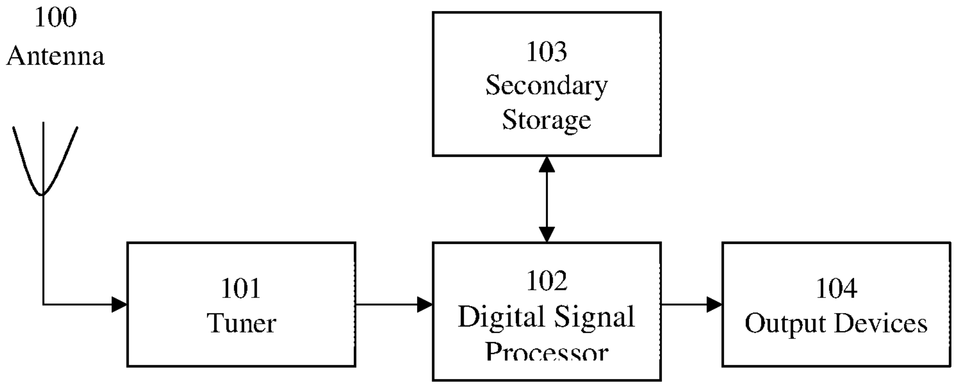
Figure 2:
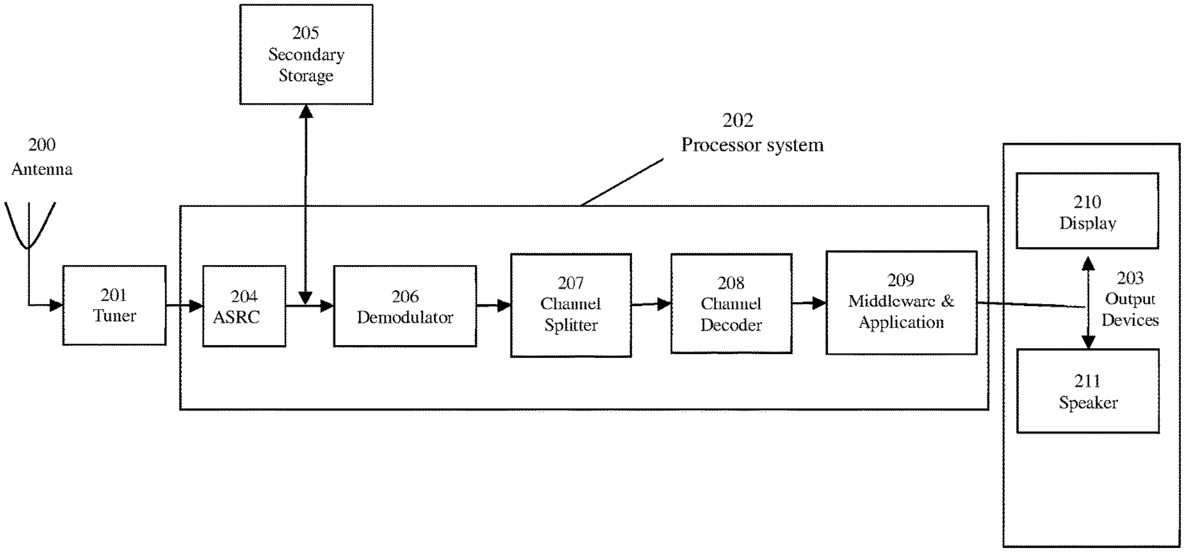

The features and advantages of the present invention will become more apparent from the following detailed descriptions along with the accompanying figures, in which:

FIG. 1: Block Diagram describing the components of the digital radio receiver system in accordance with the present invention;

FIG. 2: Block Diagram describing the interaction between the components and the process flow of the method in accordance with the present invention;

REFERENCE NUMERALS

100—Antenna
101—Tuner
102—Digital Signal Processor
103—Secondary Storage
104—Output Devices
200—Antenna
201—Tuner/Tuning systems
202—Processor system
203—Output devices
204—Arbitrary Sample Rate Converter
205—Secondary Storage system
206—Demodulator
207—Channel Splitter
208—Channel Decoder
209—Middleware and application
210—Display
211—Speaker

DETAILED DESCRIPTION OF THE INVENTION

The principles of operation, design configurations and evaluation values in these non-limiting examples can vary and are merely cited to illustrate at least one embodiment of the invention, without limiting the scope thereof.

The embodiments disclosed herein can be expressed in different forms and should not be considered as limited to the listed embodiments in the disclosed invention. The various embodiments outlined in the subsequent sections are constructed such that it provides a complete and thorough understanding of the disclosed invention, by clearly describing the scope of the invention, for those skilled in the art.

Throughout this specification, various indications have been given as preferred and alternative embodiments of the invention. It should be understood that it is the appended claims, including all equivalents, which are intended to define the spirit and scope of this invention.

The current embodiment of the present invention relates to the method of improving the audio acquisition time with the help of secondary storage caching for the nascent radio audio signal after the sample rate conversion process in the radio receiver systems. The digital broadcast radio receiver block diagram is shown in FIG. 1, which consists of the receiver antenna system (100), the tuner (101), the processor (102), and the output devices (104) which output the received signals for user consumption.

FIG. 2 gives a detailed view of the receiver processor system which includes the antenna system (200), the tuner (201) and the other parts of the receiver system in accordance with one embodiment of the present invention. The processor (202) contains the ASRC (Arbitrary Sample Rate Converter) (204), the secondary storage (205), Demodulator (206), the Channel splitter (207), the Channel decoder (208), and Middleware & Application (209). The ASRC component (204) will convert the tuned digital broadcast radio signal sample rate to the sample rate of the Demodulator.

The Demodulator (206) receives the nascent digital broadcast radio signal after the sample rate conversion. In the present invention method, the nascent digital broadcast radio signal is cached in secondary storage (205) after the sample rate conversion and also given as input to the Demodulator. The Demodulator (206) component starts the demodulation process over the received signal by utilizing default channel parameters. The Demodulator (206) component detects the channel parameters of the received signal. If the initial channel parameters utilized for the demodulation process are different from the detected channel parameters, the Demodulator starts the re-demodulation process with the detected channel parameters over the nascent digital signal cached in the secondary storage (205), instead of waiting for a subsequently transmitted signal. Since the nascent digital signal is cached in the secondary storage, the additional time taken for audio output in digital broadcasting radio is reduced.

The Demodulator output data is split into different channels by the channel splitter (207). The channel split data is decoded by the channel decoder (208). The middleware (209) will parse the channel-decoded data and process the audio and data. The application (209) sends the processed data to the desired output devices (203), such as the display (210) and speaker (211).

Acquisition time is one of the critically differentiating competitive parameters of Digital Broadcast Radio Receivers. The present invention method improves the audio acquisition time even if the initial channel parameters considered for the demodulation are wrong. This improves user experience. The presence of secondary storage (205) at the Demodulator (206) input stage aids in providing the same nascent radio signal for the repetition of the demodulation process with different demodulation parameters, depending on the input signal parameters.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should, therefore, not be limited by the above described embodiment, method, and examples, but by all embodiments and methods within the scope of the invention as claimed.

We claim:

1. A method of improving audio acquisition time by nascent signal caching, the method comprising steps of:

a. receiving a nascent digital broadcast radio signal by a demodulator (206) after sample rate conversion has been performed by an arbitrary sample rate converter (ASRC) (204);

b. caching the nascent digital broadcast radio signal after the sample rate conversion in a secondary storage (205) as well as providing the nascent digital broadcast signal as an initial input to the demodulator (206);

c. starting a demodulation process over the received nascent digital broadcast signal by the demodulator (206) by utilizing default channel parameters and detecting channel parameters of the received nascent digital broadcast radio signal; and d. registering a difference between the default channel parameters utilized for demodulation process from the detected channel parameters detected by the demodulator (206) thereby, enabling re-demodulation over the nascent digital broadcast radio signal cached in the secondary storage (205) with the detected channel parameters.

2. The method of improving audio acquisition time by nascent signal caching as claimed in claim 1, wherein, using the secondary storage (205) to cache the nascent digital broadcast radio signal in a digital radio receiver system, wherein, the digital radio receiver system includes a processor which includes the ASRC (204), the demodulator (206), a channel splitter (207), a channel decoder (208) and a middleware and application (209) along with the secondary storage (205).

3. The method of improving audio acquisition time by nascent signal caching, as claimed in claim 1, wherein, the secondary storage (205) includes at least one of a hard disk drive, a solid-state drive, an optical disk drive, a universal serial bus flash drive, and a floppy disk.

4. The method of improving audio acquisition time by nascent signal caching as claimed in claim 1, further comprising outputting data from the demodulator to a channel splitter.

5. The method of improving audio acquisition time by nascent signal caching as claimed in claim 4, further comprising splitting the output data from the demodulator by the channel splitter to generate split data.

6. The method of improving audio acquisition time by nascent signal caching as claimed in claim 5, further comprising decoding the split data from the channel splitter by a channel decoder to generate channel decoded data.

7. The method of improving audio acquisition time by nascent signal caching as claimed in claim 6, further comprising parsing the channel decoded data from the channel decoder by middleware to process as audio and data.

8. The method of improving audio acquisition time by nascent signal caching as claimed in claim 7, further comprising using an application with the middleware to send the audio and processed data to at least one output device.

9. The method of improving audio acquisition time by nascent signal caching as claimed in claim 8, wherein the at least one output device includes a speaker or a display.

10. The method of improving audio acquisition time by nascent signal caching as claimed in claim 1, further comprising receiving the nascent digital broadcast radio signal at an antenna and tuner connected to the ASRC.

11. A digital radio receiver system comprising:

a demodulator to receive a nascent digital broadcast radio signal after sample rate conversion is performed by an arbitrary sample rate converter (ASRC); and a secondary storage to cache the nascent digital broadcast radio signal after the sample rate conversion, wherein the secondary storage is connected to the demodulator, wherein the demodulator starts a demodulation process over the received nascent digital broadcast radio signal by utilizing default channel parameters and detecting channel parameters of the received nascent digital broadcast radio signal, wherein the demodulator registers a difference between the default channel parameters and the detected channel parameters, and wherein the secondary storage enables re-demodulation over the nascent digital broadcast radio signal with the detected channel parameters.

* * * * *